(12) United States Patent
Mansour et al.

(10) Patent No.: US 10,503,913 B2
(45) Date of Patent: Dec. 10, 2019

(54) MUTUAL AUTHENTICATION OF SOFTWARE LAYERS

(71) Applicant: Visa International Service Association, San Francisco, CA (US)

(72) Inventors: Rasta Mansour, Cupertino, CA (US); Soumendra Bhattacharya, Union City, CA (US); Robert Youdale, Burlingame, CA (US)

(73) Assignee: Visa International Service Association, San Francisco, CA (US)

( * ) Notice: Subject to any disclaimer, the term of this patent is extended or adjusted under 35 U.S.C. 154(b) by 439 days.

(21) Appl. No.: 15/068,189

(22) Filed: Mar. 11, 2016

(65) Prior Publication Data

US 2016/0267280 A1 Sep. 15, 2016

Related U.S. Application Data

(60) Provisional application No. 62/132,289, filed on Mar. 12, 2015.

(51) Int. Cl.
*G06F 21/60* (2013.01)
*G06F 21/44* (2013.01)
(Continued)

(52) U.S. Cl.
CPC .......... *G06F 21/602* (2013.01); *G06F 21/12* (2013.01); *G06F 21/445* (2013.01);
(Continued)

(58) Field of Classification Search
CPC .......... G06F 21/12; G06F 21/14; G06F 21/44; G06F 21/126; G06F 21/128;
(Continued)

(56) References Cited

U.S. PATENT DOCUMENTS 5,757,907 A 5/1998 Cooper et al.
6,615,350 B1 * 9/2003 Schell .................. G06F 21/33
380/30

(Continued)

FOREIGN PATENT DOCUMENTS

RU 2444143 2/2012

OTHER PUBLICATIONS

International Search Report and Written Opinion, dated Jul. 22, 2016, in PCT Application No. PCT/US2016/022125, 14 pages.
(Continued)

*Primary Examiner* — Ashokkumar B Patel
*Assistant Examiner* — William B Jones
(74) *Attorney, Agent, or Firm* — Kilpatrick Townsend & Stockton LLP

(57) ABSTRACT

Techniques for establishing mutual authentication of software layers of an application are described. During initialization of the application, the software layers execute a binding algorithm to exchange secrets to bind the software layers to one another. During subsequent runtime of the software application, the software layers execute a runtime key derivation algorithm to combine the secrets shared during initialization with dynamic time information to generate a data encryption key. The software layers can then securely transfer data with each other by encrypting and decrypting data exchanged between the software layers using the dynamically generated data encryption key.

17 Claims, 10 Drawing Sheets

(51) Int. Cl.
*G06F 21/12* (2013.01)
*H04L 9/08* (2006.01)
*H04L 9/32* (2006.01)
*G06F 21/14* (2013.01)

(52) U.S. Cl.
CPC .......... *H04L 9/0861* (2013.01); *H04L 9/0877* (2013.01); *H04L 9/0897* (2013.01); *H04L 9/3234* (2013.01); *H04L 9/3271* (2013.01); *H04L 9/3273* (2013.01); *G06F 21/14* (2013.01); *G06F 2211/003* (2013.01); *H04L 2209/127* (2013.01)

(58) Field of Classification Search
CPC ... G06F 21/445; G06F 21/602; H04L 9/0816; H04L 9/0861; H04L 9/0897; H04L 9/3273; H04L 9/3271; H04L 9/0877; H04L 2209/127
USPC ........................................................ 713/189
See application file for complete search history.

(56) References Cited

U.S. PATENT DOCUMENTS

| | | | |
|---|---|---|---|
| 6,862,683 B1 | 3/2005 | Wille et al. | |
| 7,162,711 B2 | 1/2007 | Czajkowski et al. | |
| 7,424,615 B1 | 9/2008 | Jalbert et al. | |
| 8,196,213 B2 | 6/2012 | Klucher et al. | |
| 8,683,462 B2 | 3/2014 | Goldman | |
| 8,762,720 B2 | 6/2014 | Charrat et al. | |
| 8,863,126 B2 | 10/2014 | Poore et al. | |
| 2002/0178237 A1* | 11/2002 | Sakata | G06Q 10/107 709/219 |
| 2003/0035547 A1 | 2/2003 | Newton | |
| 2006/0288215 A1 | 12/2006 | Takemura et al. | |
| 2009/0024848 A1* | 1/2009 | Takasugi | H04L 9/3236 713/169 |
| 2009/0219559 A1* | 9/2009 | Lee | G03G 15/5066 358/1.14 |
| 2009/0293117 A1 | 11/2009 | Yan et al. | |
| 2011/0314279 A1 | 12/2011 | Ureche et al. | |
| 2015/0326395 A1* | 11/2015 | Lemke | H04L 9/0827 713/155 |

OTHER PUBLICATIONS

Supplementary European Search Report, dated Oct. 16, 2018, in EP Application No. 16762648.0, 8 pages.
RU2017134356, "Office Action", dated Sep. 11, 2019, 14 pages.

* cited by examiner

MUTUAL AUTHENTICATION OF SOFTWARE LAYERS

CROSS-REFERENCES TO RELATED APPLICATIONS

This application claims the benefit of priority to U.S. Provisional Application No. 62/132,289 filed on Mar. 12, 2015, which is herein incorporated by reference in its entirety for all purposes.

BACKGROUND

A software application may have multiple software components or software layers (may also be referred to as software libraries) that communicate or exchange data with each other. For example, code executing in one layer may call functions implemented in another layer, or code executing in one layer may pass parameters or data to another layer. Because of the modularized nature of such an environment, a security vulnerability can exist at the exposed interface between the software layers. For instance, a man-in-the-middle application can eavesdrop on the data being passed between the software layers to obtain sensitive information, or unauthorized code can directly invoke functions implemented in a shared software layer and obtain sensitive data processed by that shared software layer.

Embodiments of the present invention address these and other problems, individually and collectively.

BRIEF SUMMARY

Embodiments of the present invention provide techniques that can be used to mutually authenticate software layers that communicate with each other. In some embodiments, the software layers can be part of a software application executing on a computing device. To establish mutual authentication between a first software layer and a second software layer of an application, a binding algorithm can be executed at initialization of the application to exchange secrets between the software layers. Thereafter, during runtime execution of the application, data exchanged between the software layers can be encrypted using a data encryption key derived based on the shared secrets generated during initialization of the application. In some embodiments, a process for establishing mutual authentication between a first software layer and a second software layer of an application may involve using a data encryption key derived based on a first nonce generated by the first software layer and a second nonce generated by the second software layer during initialization of the application.

According to some embodiments, during runtime execution, a process for establishing mutual authentication performed by the first software layer may include retrieving, by the first software layer of the application executing on a computing device, binding information stored by the first software layer during the initialization of the application, and decrypting the binding information to obtain a second nonce that was generated by the second software layer during initialization. The process may further include receiving, by the first software layer, an encrypted first nonce from the second software layer of the application, decrypting the encrypted first nonce to obtain the first nonce. The first software layer may then derive a data encryption key based on the first nonce and the second nonce, and thereafter encrypt data being sent from the first software layer to the second software layer using the data encryption key. The data encryption key can also be used to decrypt data received from the second software layer. In some embodiments, the data encryption key can be derived further based on dynamic time information.

According to some embodiments, during runtime execution, a process for establishing mutual authentication performed by the second software layer may include retrieving, by the second software layer executing on a computing device, binding information stored by the second software layer during the initialization of the application, and decrypting the binding information to obtain the first nonce. The process may also include receiving, by the second software layer, an encrypted second nonce from the first software layer, and decrypting the encrypted second nonce to obtain the second nonce. The second software layer may then derive the data encryption key based on the first nonce and the second nonce, and thereafter encrypt data being sent from the second software layer to the first software layer using the data encryption key. The data encryption key can also be used to decrypt data received from the first software layer. In some embodiments, the data encryption key can be derived further based on dynamic time information.

According to some embodiments, a computing device may include a processor, and a memory coupled to the processor and storing computer readable code for implementing an application having a first software layer and a second software layer. The computer readable code, when executed by the processor, may cause the first software layer and second software layer to perform their respective mutual authentication processes:

DETAILED DESCRIPTION

Figure 1:
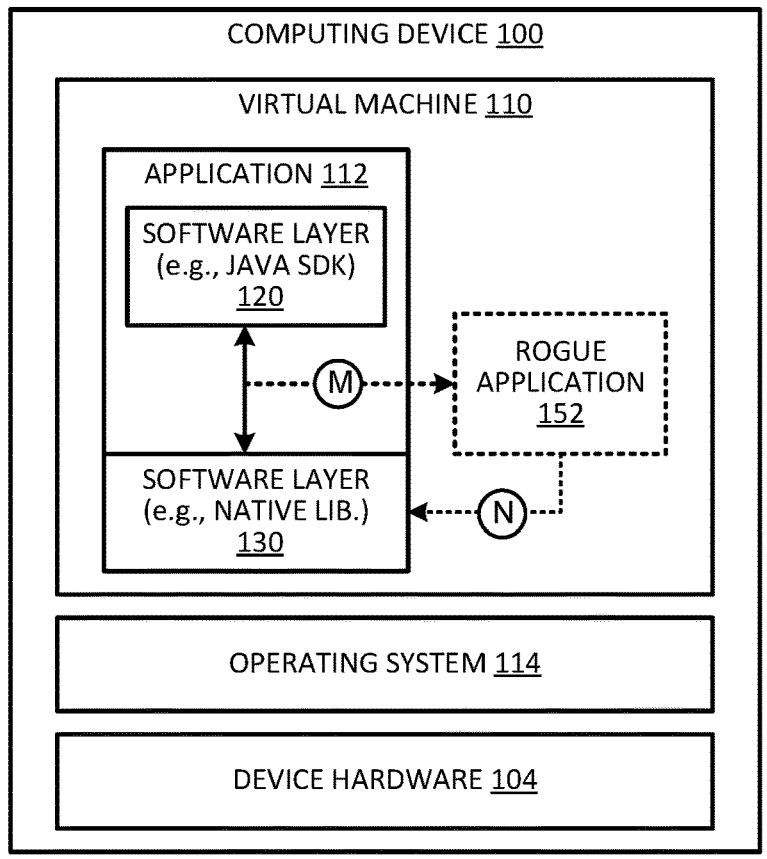
FIG. 1 illustrates a block diagram of a computing device, according to some embodiments.

Embodiments of the present invention provide techniques that can be used to mutually authenticate software layers that communicate with each other. In some embodiments, the software layers can be part of a software application executing on a computing device. To mitigate against vulnerabilities at the software layer interface, each software layer can be authenticated to each other to assure that functions in a software layer is being called by a known entity or known software component, and that the caller is authorized to invoke the called function. The data passed back and forth between the software layers can also be encrypted to stay opaque to any man-in-the-middle eavesdropping on the data exchange to assure data confidentiality and integrity.

According to some embodiments, during the first time initialization of the software layers (e.g., when the software application is first compiled and installed on a device, or the first time that the software application is executed), the software layers execute a binding algorithm to exchange secrets to bind the software layers to one another. During subsequent runtime of the software application, the software layers execute a runtime key derivation algorithm to combine the secrets shared during initialization with dynamic time information to generate a data encryption key. The software layers can then securely transfer data with each other by encrypting and decrypting data exchanged between the software layers using the dynamically generated data encryption key.

The shared secrets and binding algorithm executed at first time initialization provide a way for the software layers to mutually authenticate each other during runtime, because an unauthorized application would not have knowledge of the secrets shared during initialization. This can mitigate against a rouge application attempting to invoke functions in one of the software layers, because a rouge application would not be able to generate a proper data encryption key to communicate with the software layer being called. Encryption of the data transferred between the software layers using the data encryption key also mitigates against man-in-the-middle eavesdropping, because the data transferred between the software layers are not sent in the clear, but are instead sent in an encrypted form and can only be decrypted by a proper data encryption key. Incorporation of dynamic time information in the key derivation algorithm also mitigates against key cracking, because the data encryption key is dynamically generated at runtime and changes over time. The techniques described herein are also scalable and can be easily deployed to millions of devices, because the binding algorithm and key derivation algorithm can be deployed as part of the code written into the software layers, and unlike digital certificate techniques, the dynamic nature of the key derivation algorithm does not require periodical renewal with an external entity.

Prior to discussing the details of some embodiments of the present invention, description of some terms may be helpful in understanding the various embodiments.

A "communication device" may be a device that includes one or more electronic components (e.g., an integrated chip) that can communicate with another device. For example, a communication device can be a computing device that includes at least one processor coupled to a memory that stores instructions or code for execution by the processor. A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "server computer" may include a powerful computer or cluster of computers.

For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer. In some embodiments, an issuer may refer to a provider of a software application.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network, and for interacting with a transaction device (e.g., a payment device), a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "limited-use key" or "LUK" may refer to a key that can be used for only a limited time or a limited number of transactions, and may need to be renewed or replenished when the limited usage has been exhausted. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds may include at least one of a number of transactions that the LUK can be used for, a time-to-live indicating the duration of time for which the LUK is valid, and/or a cumulative transaction amount indicating the total transaction amount summed across one or more transactions for which the LUK is valid, or any combination thereof.

A "limited-use threshold" may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of some embodiments of the present invention will now be described.

FIG. 1 illustrates a software operating environment in a computing device 100, according to some embodiments. Computing device 100 can be a computer, a communication device, a portable communication device in the form of a mobile device such as a mobile phone (e.g., smart phone, cellular phone, etc.), a tablet, a portable media player, a personal digital assistant device (PDA), a wearable computing device (e.g., watch), an electronic reader device, a laptop, a netbook, an ultrabook, etc., or in the form of a card (e.g., smart card) or a fob, etc. In some embodiments, computing device 100 can also be part of a vehicle (e.g., an automobile). Computing device 100 may include device hardware 104 such as one or more processors, an operating system 114, and an application 112 executing on computing device 100. In some embodiments, application 122 can be executed within a virtual machine 110.

Application 112 may include multiple software layers. For example, application 122 may include software layer 120 and software layer 130. Software layers 120 and 130 can be provided by the same developer or be provided by different entities. In some embodiments, software layers 120 and 130 can be written in the same or different programming languages. For example, software layer 120 can be written in a high level programming language such as Java, and can be implemented as a software development kit (SDK). Software layer 130 can be a native layer or native library, and can be written in a low level programming language such as C or C++. In some embodiments, software layer 130 can be a native library that is shared amongst components executing in virtual machine 110. Software layer 120 can communicate with software layer 130 to exchange data and invoke functions implemented in software layer 130, and vice versa, via an interface between the two software layers. In some embodiments, the interface between software layers 120 and 130 can be a Java Native Interface (JNI).

It should also be noted that in some embodiments, software layers 120 and 130 are part of one single application 112. Thus, for example, application 112 including software layers 120 and 130 can be downloaded initially from an application store as a single application package, and installed on communication device 100 as a single application. Application 112 including software layers 120 and 130 can be represented as one icon on a user interface of communication device 100, and application 112 including software layers 120 and 130 can be treated by operating system 114 as one application.

According to some embodiments, application 112 can be an application that uses or processes sensitive information. For example, application 112 can be a transaction application that is used to conduct transactions with a user's account credentials. Due to the modularized nature of application 112, without proper safeguards, the interface between software layers 120 and 130 can be susceptible to man-in-the-middle eavesdropping or unauthorized invocation of functions implemented in the software layers. For example, a rogue application 152 (e.g., unauthorized code, malware, etc.) may observe the functions being called by the software layers and parameters being transferred between the software layers (indicated by the data path M). If the function calls and parameters are sent in the clear, it may be possible for rouge application 152 to obtain sensitive information such as a user's account credentials from the observed data. As another example, if software layers 120 and 130 do not require proper authentication of a calling party, rogue application 152 may directly invoke functions implement in software layer 130 to obtain sensitive data accessible by software layer 130 (indicated by the data path N).

Figure 2:
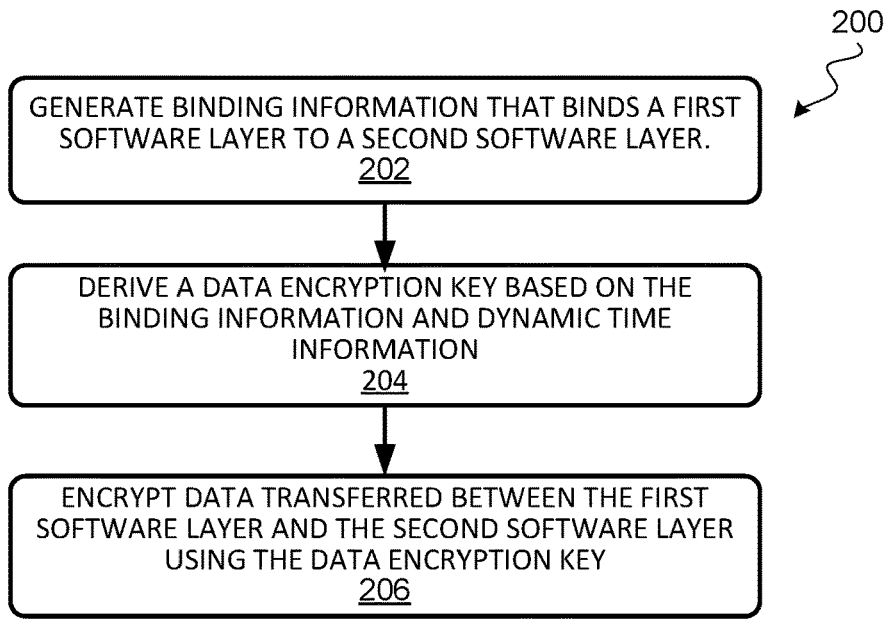
FIG. 2 illustrates a flow diagram of a process for mutual authentication of software layers, according to some embodiments.

FIG. 2 illustrates a flow diagram of a process 200 that can be used to mutually authenticate software layers (e.g., software layers 120 and 130) to mitigate against these vulnerabilities, according to some embodiments. It should be understood that the techniques described herein can be applied to any software application that has multiple software layers, and that in some embodiments, the software application can have more than two software layers. At block 202, process 200 can generate binding information that binds a first software layer to a second software during first time initialization of the software application executing on a computing device. In some embodiments, block 202 can be executed only once during the lifetime of the software application (e.g., when the software application is initially installed on the computing device, or during the first time the software application is executed or used). The purpose of block 202 is to bind together the software layers by exchanging and securely storing some secret data which can be used later during runtime to authenticate the software layers to each other. Block 202 is ideally the first lines of code of the software application. The binding established at block 202 allows subsequent function calls between the software layers to be trusted as being invoked by an authenticated party. In some embodiments, the presence of the binding information on the computing device can determine if block 202 needs to be executed. The absence of binding information on the computing device may indicate that this is the first time the software application is being used, and thus block 202 should be executed.

At block 204, during runtime of the software application, process 200 can execute a key derivation algorithm to derive a data encryption key based on the binding information generated from block 202. The data encryption key may also be further based on dynamic time information. The dynamic time information can be, for example, the amount of elapsed time from the time when block 202 is executed at first time initialization to the time when block 204 is subsequently executed. Block 204 can be executed each time the software application is started or used on the computing device (e.g., when the computing device is powered up, when a user launches the software application, or when a user uses the software application to perform a task, etc.). Block 204 can achieve mutual authentication of the software layers because only authorized software layers would have knowledge of the binding information generated at block 202. The data encryption key derived at block 204 can then be used during subsequent communication between the software layers to encrypt function calls and data to/from the software layers to achieve data confidentiality. It should be noted that in some embodiments, because dynamic time information is included in the key derivation process, a different data encryption key can be generated each time block 204 is executed, and thus the data encryption key is dynamic in nature and changes over time as the application is used to prevent key cracking.

At block 206, process 200 encrypts the data being transferred between the first software layer and the second software layer using the data encryption key derived at block 204. The recipient software layer can decrypt the encrypted data using its own data encryption key. It should be noted that in some embodiments, the communication channel itself between the software layers is not encrypted. Rather, in some embodiments, the input data parameters and any response data that require confidentiality can be encrypted. Blocks 204 and 206 can be repeated each time the software application is launched on the computing device.

In some embodiments, additional safeguards can be deployed to protect the software layers from rogue applications and unauthorized access. For example, code obfuscation techniques can be used to mask the underlying code. Runtime safeguards may include determining if the software layer is being called under a debugger session or if the software layer is running with root-privilege. Detection of these scenarios may indicate a potential breach, and the affected software layer can be set to cease communication with other software layers or refuse authentication with other software layers.

Figure 3:
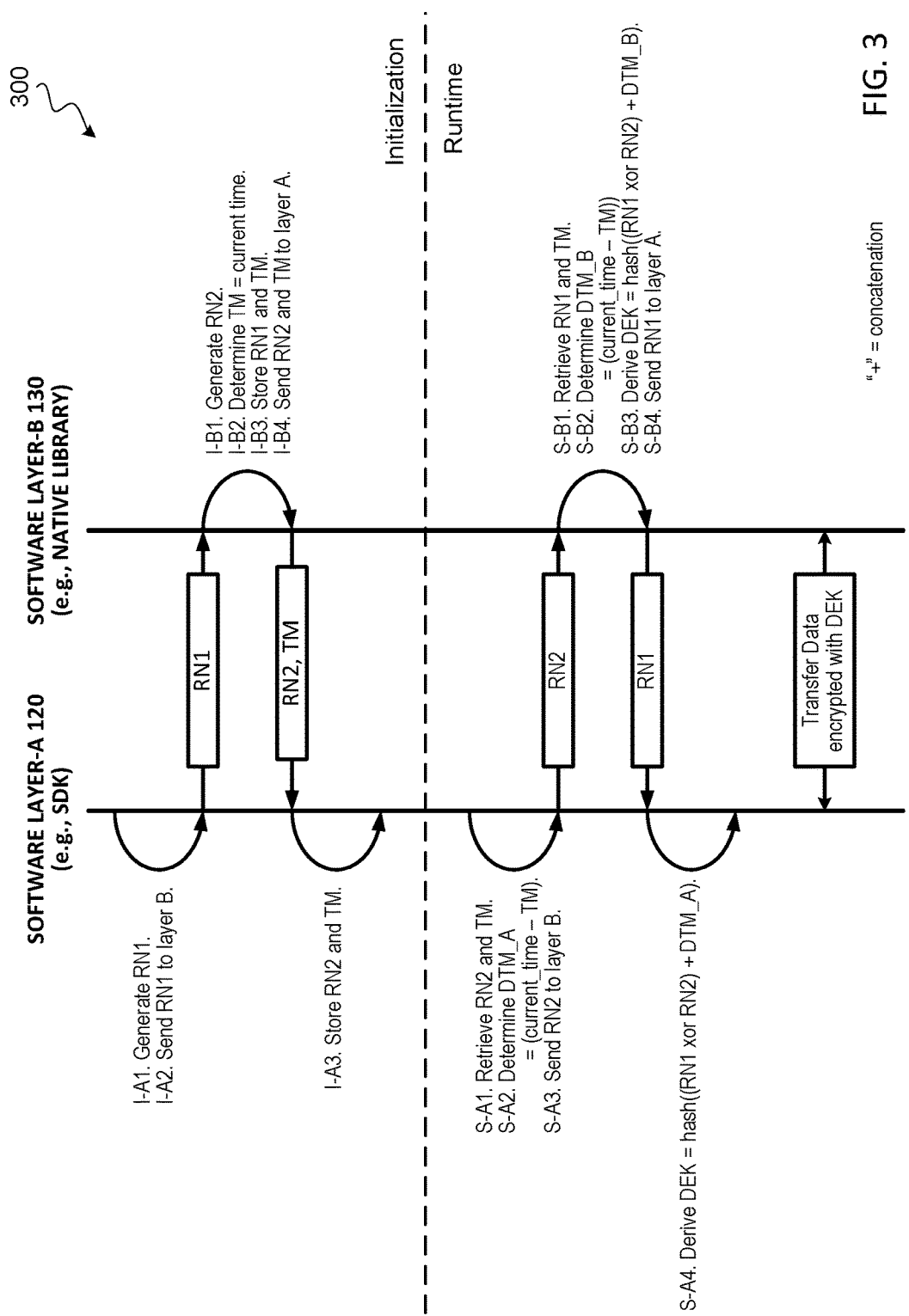
FIG. 3 illustrates a communication flow diagram of a process for mutual authentication of software layers, according to some embodiments.

FIG. 3 illustrates a communication flow diagram of an overview of an example process for establishing mutual authentication between a first software layer (e.g., software layer-A 120) and a second software layer (e.g., software layer-B 130), according to some embodiments. The process may include a binding algorithm that is executed during first time initialization of the application, and a key derivation algorithm that is executed during runtime of the application. For ease of explanation, the steps performed in the binding algorithm during the first time initialization are denoted as "I-Xn" where X indicates the software layer, and n is the step performed by that software layer. The steps performed in the key derivation algorithm during runtime are denoted as "S-Xn" where X indicates the software layer, and n is the step performed by that software layer. In some embodiments, software layer-A 120 can be a SDK (e.g., written in Java), and software layer-B can be a native library (e.g., written in C or C++), or vice versa. In some embodiments, the two software layers can be written in the same language.

The mutual authentication process can be initiated by the software layer that is executed first when the application starts up (e.g., software layer-A 120). In some embodiments, it is not necessary for the initiating software layer to be the software layer that is executed first when the application starts up. If the application performs security sensitive functions, the security sensitive functions can be implement in a software layer other than the software layer that initiates the mutual authentication process (e.g., software layer-B 130). In some embodiments, the security sensitive functions can be implemented in the software layer that initiates the mutual authentication process.

At step I-A1, software layer-A 120 begins its execution of the binding algorithm and generates a random number RN1, which is used as a first nonce. RN1, for example, may have a bit length of 256-bits. At step IA-2, software layer-A 120 sends RN1 to software layer-B 130. RN1 serves as a secret generated by software layer-A 120 and shared with software layer-B 130 to bind the two software layers. In some embodiments, RN1 is not stored by software layer-A 120.

At step I-B1, software layer-B 130 generates its own random number (RN2), which is used as a second nonce. In some embodiments, software layer-B 130 may generate RN2 in response to receiving RN1 from software layer-A 120. RN2, for example, may have a bit length of 256-bits. RN2 serves as a secret generated by software layer-B 130 and shared with software layer-A 120 to bind the two software layers. At step I-B2, software layer-B 130 determines the initialization time information TM, which indicates the current time at which the binding algorithm is being executed. In some embodiments, the initialization time information TM can be a timestamp, or a numeric value derived from the timestamp, for example, by combining the timestamp with RN1 and/or RN2 using one or more suitable computation operations (e.g,. TM=timestamp+(RN1 xor RN2)). At step I-B3, software layer-B 130 stores RN1 from the first software layer-A 120 and the initialization time information TM as binding information. At step I-B4, software layer-B 130 sends RN2 and the initialization time information TM to software layer-A 120. In some embodiments, RN2 is not stored by software layer-B 130.

At step I-A3, software layer-A 120 stores RN2 and TM received from software layer-B 130 as binding information. Once both software layers have stored their respective binding information, the binding algorithm can be terminated. Software layer-A 120 now has RN2 and TM from software layer-B 130, and software layer-B 130 now has RN1 from software layer-A 120. Thus, the two software layers have exchanged shared secrets to bind the two software layers to each other. The shared secrets can be used during runtime to derive a data encryption key to encrypt and decrypt data being transferred between the two software layers. In this manner, mutual authentication of the software layers can be achieved, because only authorized software layers would have knowledge of the proper binding information to generate a valid data encryption key.

During runtime execution of the application, at step S-A1, software layer-A 120 begins the key derivation algorithm by retrieving RN2 and TM, which were previously stored by software layer-A 120 as binding information during initialization. At step S-A2, software layer-A 120 determines dynamic time information DTM_A, which provides an indication of the elapsed time from when the binding algorithm was execute (as indicated by TM) to the current time at which the key derivation algorithm is being executed. For example, DTM_A can be the difference between the current time and TM. This dynamic time information DTM_A can be combined with the binding information to generate a data encryption key in subsequent steps. At step S-A3, software layer-A 120 sends RN2 to software layer-B 130.

At step S-B1, software layer-B 130 retrieves RN1 and TM, which were previously stored by software layer-B 130 as binding information during initialization. At step S-B2, software layer-B 130 determines dynamic time information DTM_B. For example, DTM_B can be the difference between the current time and TM. At step S-B3, software layer-B 130 derives its data encryption key DEK based on the first nonce RN1, the second nonce RN2 received from software layer-A 120, and dynamic time information DTM_B. The DEK is used by software layer-B 130 to encrypt and decrypt subsequent data transferred between the two software layers in the current runtime session. At step S-B4, software layer-B 130 sends RN1 to software layer-A 120.

At step S-A4, software layer-A 120 derives its data encryption key DEK based on the first nonce RN1 received from software layer-B 130, the second nonce RN2, and dynamic time information DTM_A. The DEK is used by software layer-A 120 to encrypt and decrypt subsequent data transferred between the two software layers in the current runtime session.

Once both software layers have derived their respective data encryption keys, the software layers can start transferring data to one another. The data exchanged between the software layers can be encrypted and decrypted using their respective data encryption keys. The two software layers are now mutually authenticated, because an unauthorized software component would not be able to derive a proper data encryption key to encrypt and decrypt the data being exchanged.

I. First Software Layer Processes

Figure 4:
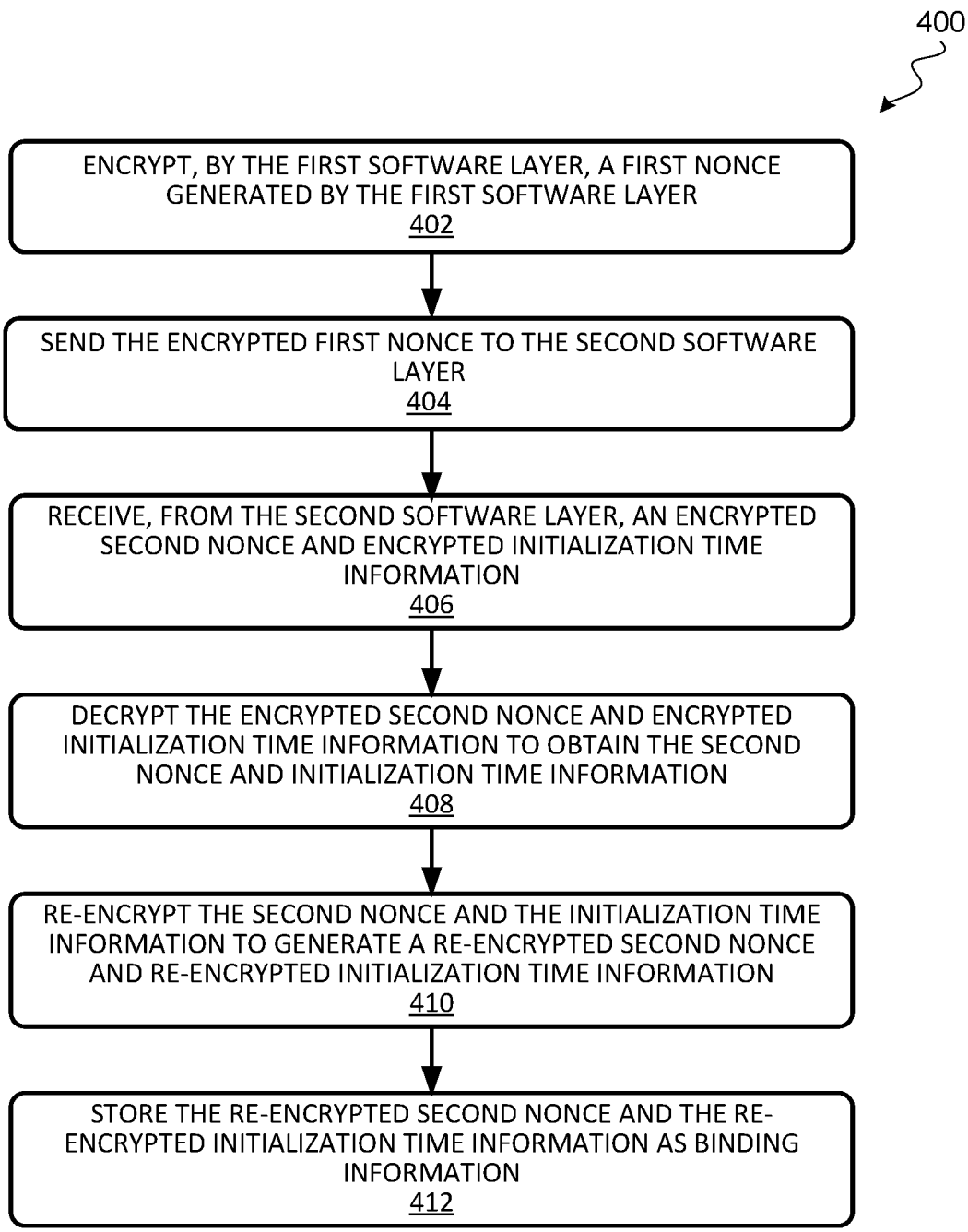
FIG. 4 illustrates a flow diagram of a binding algorithm performed by a software layer, according to some embodiments.
Figure 5:
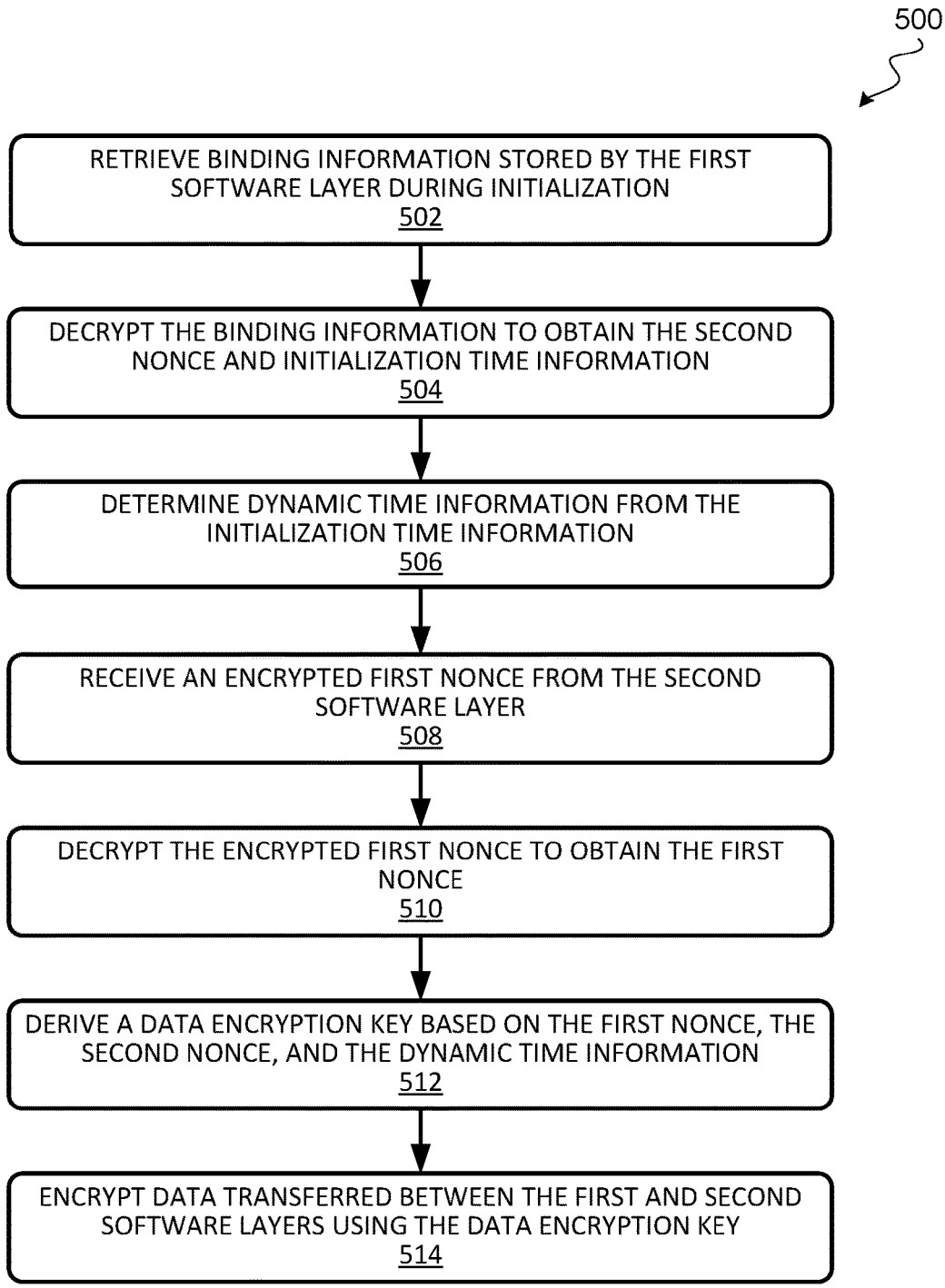
FIG. 5 illustrates a flow diagram of a key derivation algorithm performed by a software layer, according to some embodiments.

FIGS. 4-5 illustrate flow diagrams of processes 400 and 500, respectively, that can be performed by a first software layer executing on a computing device to achieve mutual authentication and secure data transfer between the first software layer and a second software layer, according to some embodiments. Process 400 implements a binding algorithm that can be executed by the first software layer, and can be performed as part of block 202 in process 200 during first time initialization. Process 500 implements a key derivation algorithm that can be executed by the first software layer, and can be performed as part of block 204 in process 200 during subsequent runtime sessions.

Referring to FIG. 4, at block 402, during first time initialization of the software application, the first software layer generates a first nonce, and encrypts the first nonce. In some embodiments, the first nonce generated by the first software layer can be a random or a pseudo-random number. The first nonce can be encrypted using a binding key derived from a computing device identifier associated with the computing device (e.g., International Mobile Station Equipment Identity (IMEI), device serial number, etc.), an issuer identifier associated with an issuer of the application, or any combination thereof. At block 404, the encrypted first nonce is sent to the second software layer. This first nonce serves as a secret from the first software layer that is being shared with the second software layer.

At block 406, the first software layer receives an encrypted second nonce and encrypted initialization time information from the second software layer. The second nonce can be a random or pseudo-random number generated by the second software layer, and serves as a secret being shared by the second software layer. The initialization time information can be information indicative of the current time at which the binding algorithm is executed. At block 408, the encrypted second nonce and encrypted initialization time information are decrypted by the first software layer to obtain the second nonce and the initialization time information in their unencrypted form.

At block 410, the second nonce and initialization time information are re-encrypted to generate a re-encrypted second nonce and re-encrypted initialization time information. At block 412, the first software layer stores the re-encrypted second nonce and re-encrypted initialization time information as binding information, for example, in an external file or a hardware security module (HSM). The encryption key used by the first software layer to re-encrypt the second nonce and initialization time information can be a different key that what was used by the second software layer. For example, the encryption key used by the first software layer to re-encrypt the second nonce and initialization time information can be a binding key derived by combining the first nonce and one or more computing device identifiers associated with the computing device.

This allows the second nonce and initialization time information to be stored in a different form than what was sent from the second software layer. When the software application is started in subsequent runtime sessions, the binding information stored by the first software layer can be retrieved and provided to the second software layer to authenticate the first software layer to the second software layer. The binding information can also be used in a key derivation algorithm such as process 500 to derive a data encryption key in each runtime session to encrypt data being transferred between the two software layers.

Referring to FIG. 5, process 500 can be executed by the first software layer during each subsequent runtime session of the software application to dynamically derive a per session data encryption key. At block 502, the first software layer retrieves the binding information stored by the first software layer during the binding algorithm described above at initialization of the application. For example, the binding information can be retrieved from an external file or HSM. At block 504, the binding information is decrypted to obtain the second nonce and initialization time information. At block 506, dynamic time information is determined based on the initialization time information. For example, the dynamic time information can be indicative of the elapsed time since the software application was first initialized. In other words, the dynamic time information can be a representation of the amount of time that have elapsed between the execution of process 400 and execution of process 500.

At block 508, the first software layer receives an encrypted first nonce from the second software layer. At block 510, the encrypted first nonce is decrypted to obtain the first nonce in an unencrypted form. At block 512, the first software layer derives a data encryption key based on the first nonce, the second nonce, and the dynamic time information. In some embodiments, the data encryption key can be derived by combining the first nonce and the second nonce to generate a combined nonce, concatenating the combined nonce with the dynamic time information, and hashing a result of the concatenating. For example, the data encryption key for the first software layer can be derived by applying a hash to the concatenation of: (1) the result of XOR-ing the first nonce and the second nonce; and (2) the dynamic time information.

At block 514, the first software layer encrypts data being sent from the first software layer to the second software layer using the derived data encryption key, such that the data transferred between the first and second software layers during runtime are encrypted. The first nonce received from the second software layer (which was originally generated by the first software layer and provided to the second software layer during initialization) can be used by the first software layer to authenticate the second software layer. If the first nonce received from the second software layer is incorrect, the data encryption key derived based in part on this first nonce received from the second software layer would be an improper key, and the first software layer would not be able to properly decrypt communications from the second software layer and would not be able to respond to the second software layer. Thus, this mechanism of deriving the data encryption key using binding information generated at initialization can provide an implicit authentication of the software layers.

II. Second Software Layer Processes

Figure 6:
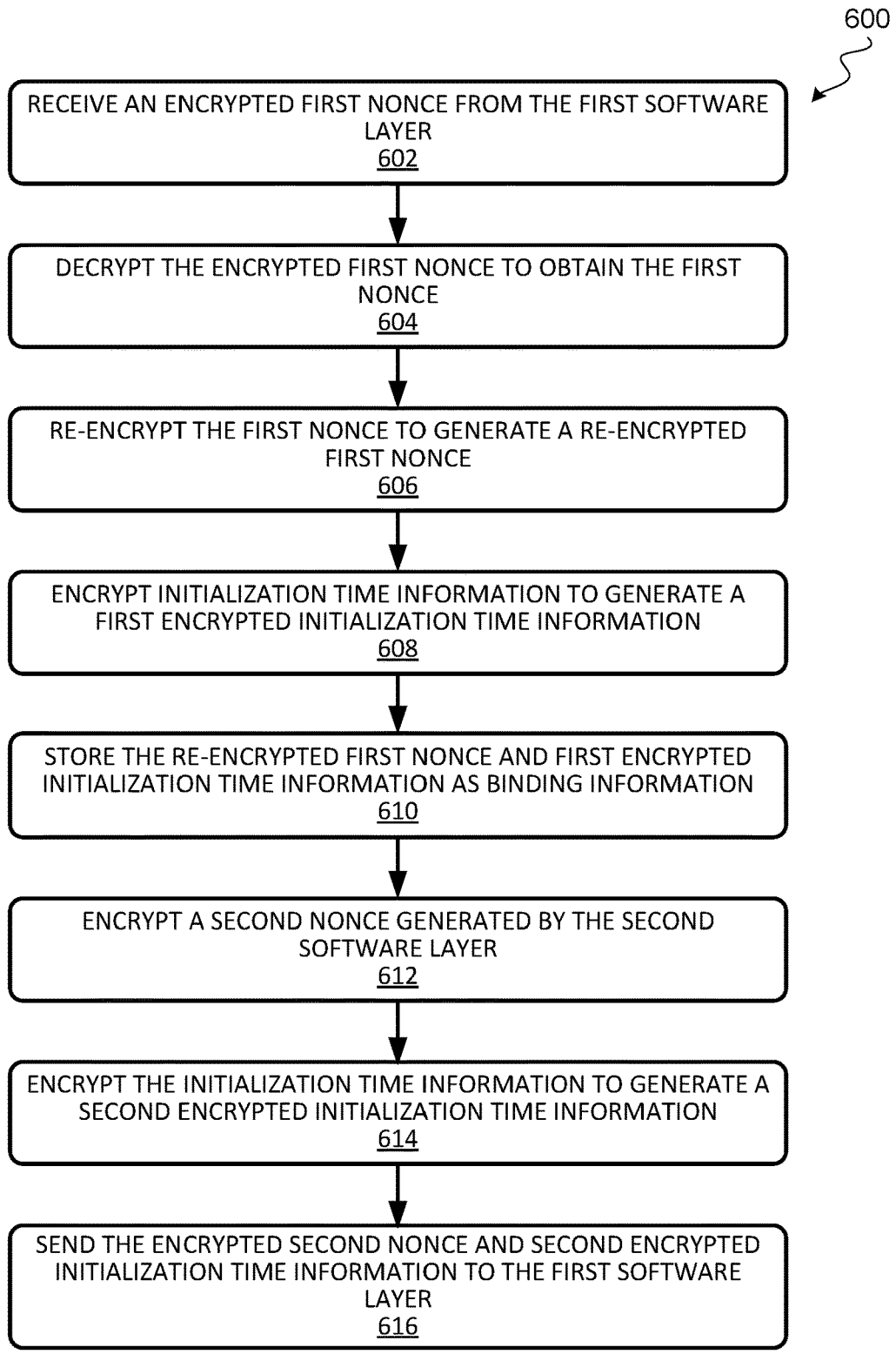
FIG. 6 illustrates a flow diagram of a binding algorithm performed by another software layer, according to some embodiments.
Figure 7:
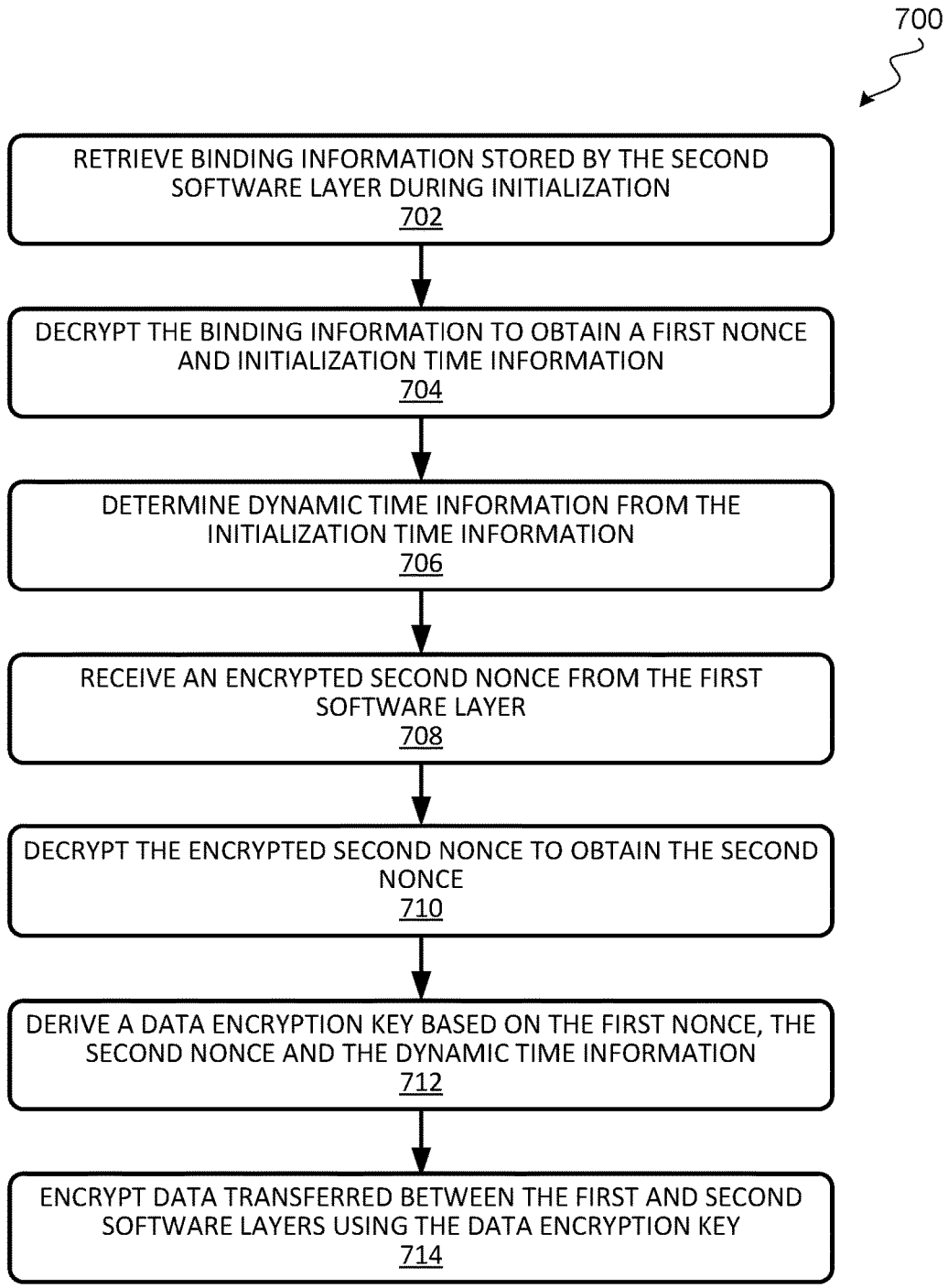
FIG. 7 illustrates a flow diagram of a key derivation algorithm performed by another software layer, according to some embodiments.

FIGS. 6-7 illustrate flow diagrams of processes 600 and 700, respectively, that can be performed by a second software layer executing on a computing device to achieve mutual authentication and secure data transfer between the first software layer and the second software layer, according to some embodiments. Process 600 implements a binding algorithm that can be executed by the second software layer, and can be performed as part of block 202 in process 200 during first time initialization. Process 700 implements a key derivation algorithm that can be executed by the second software layer, and can be performed as part of block 204 in process 200 during subsequent runtime sessions.

Referring to FIG. 6, at block 602, during first time initialization of the software application, the second software layer receives an encrypted first nonce from the first software layer to initiate the binding algorithm at the second software layer. The first nonce can be a random or pseudo-random number generated by the first software layer, and serves as a secret being shared by the first software layer. At block 604, the encrypted first nonce is decrypted to obtain the first nonce in an unencrypted form. At block 606, the first nonce is re-encrypted to generate a re-encrypted first nonce. At block 608, initialization time information is encrypted by the second software layer to generate a first encrypted initialization time information. The initialization time information can be information indicative of the current time at which the binding algorithm is executed.

At block 610, the re-encrypted first nonce and first encrypted initialization time information are stored as binding information, for example, in an external file or HSM. The encryption key used by the second software layer to re-encrypt the first nonce and initialization time information can be a different key that what was used by the first software layer. For example, the encryption key used by the second software layer to re-encrypt the first nonce and initialization time information can be a binding key derived from combining the second nonce and one or more computing device identifiers associated with the computing device. This allows the first nonce and initialization time information to be stored in a different form than what was sent from the first software layer. When the software application is started in subsequent runtime sessions, this binding information stored by the second software layer can be retrieved and provided to the first software layer to authenticate the second software layer to the first software layer. The binding information can also be used in a key derivation algorithm such as process 700 to derive a data encryption key in each runtime session to encrypt data being transferred between the two software layers.

At block 612, the second software layer generates a second nonce, and encrypts the second nonce. In some embodiments, the second nonce generated by the second software layer can be a random or a pseudo-random number. The second nonce can be encrypted using a binding key derived from a computing device identifier associated with the computing device (e.g., IMEI, device serial number, etc.), an issuer identifier associated with an issuer of the application, the first nonce that was generated by and received from the first software layer, or any combination thereof. This second nonce serves as a secret from the second software layer that is being shared with the first software layer. At block 614, the initialization time information is encrypted to generate a second encrypted initialization time information. The initialization time information can be encrypted using the same binding key that is used to encrypt the second nonce. At block 616, the encrypted second nonce and second encrypted initialization time information are sent to the first software layer to provide the first software layer with binding information generated by the second software layer.

Referring to FIG. 7, process 700 can be executed by the second software layer during each subsequent runtime session of the software application to dynamically derive a per session data encryption key. At block 702, the second software layer retrieves the binding information stored by the second software layer during the initialization of the application. The binding information can be retrieved, for example, from an external file or HSM. At block 704, the binding information is decrypted to obtain the first nonce and initialization time information. At block 706, dynamic time information is determined based on the initialization time information. For example, the dynamic time information can be indicative of the elapsed time since the software application was first initialized. In other words, the dynamic time information can be a representation of the amount of time that have elapsed between the execution of process 600 and execution of process 700.

At block 708, the second software layer receives an encrypted second nonce from the first software layer. At block 710, the encrypted second nonce is decrypted to obtain the second nonce in its unencrypted form. At block 712, the second software layer derives a data encryption key based on the first nonce, the second nonce, and the dynamic time information. In some embodiments, the data encryption key can be derived by combining the first nonce and the second nonce to generate a combined nonce, concatenating the combined nonce with the dynamic time information, and hashing a result of the concatenating. For example, the data encryption key for the second software layer can be derived by applying a hash to the concatenation of: (1) the result of XOR-ing the first nonce and the second nonce; and (2) the dynamic time information.

At block 714, the second software layer encrypts data being sent from the second software layer to the first software layer using the derived data encryption key, such that the data transferred between the first and second software layers during runtime are encrypted. The second nonce received from the first software layer (which was originally generated by the second software layer and provided to the first software layer during initialization) can be used by the second software layer to authenticate the first software layer. If the second nonce received from the first software layer is incorrect, the data encryption key derived based in part on this second nonce received from the first software layer would be an improper key, and the second software layer would not be able to properly decrypt communications from the first software layer and would not be able to respond to the first software layer. Thus, this mechanism of deriving the data encryption key using binding information generated at initialization can provide an implicit authentication of the software layers.

III. Example Implementation of Binding Algorithm

Figure 8:
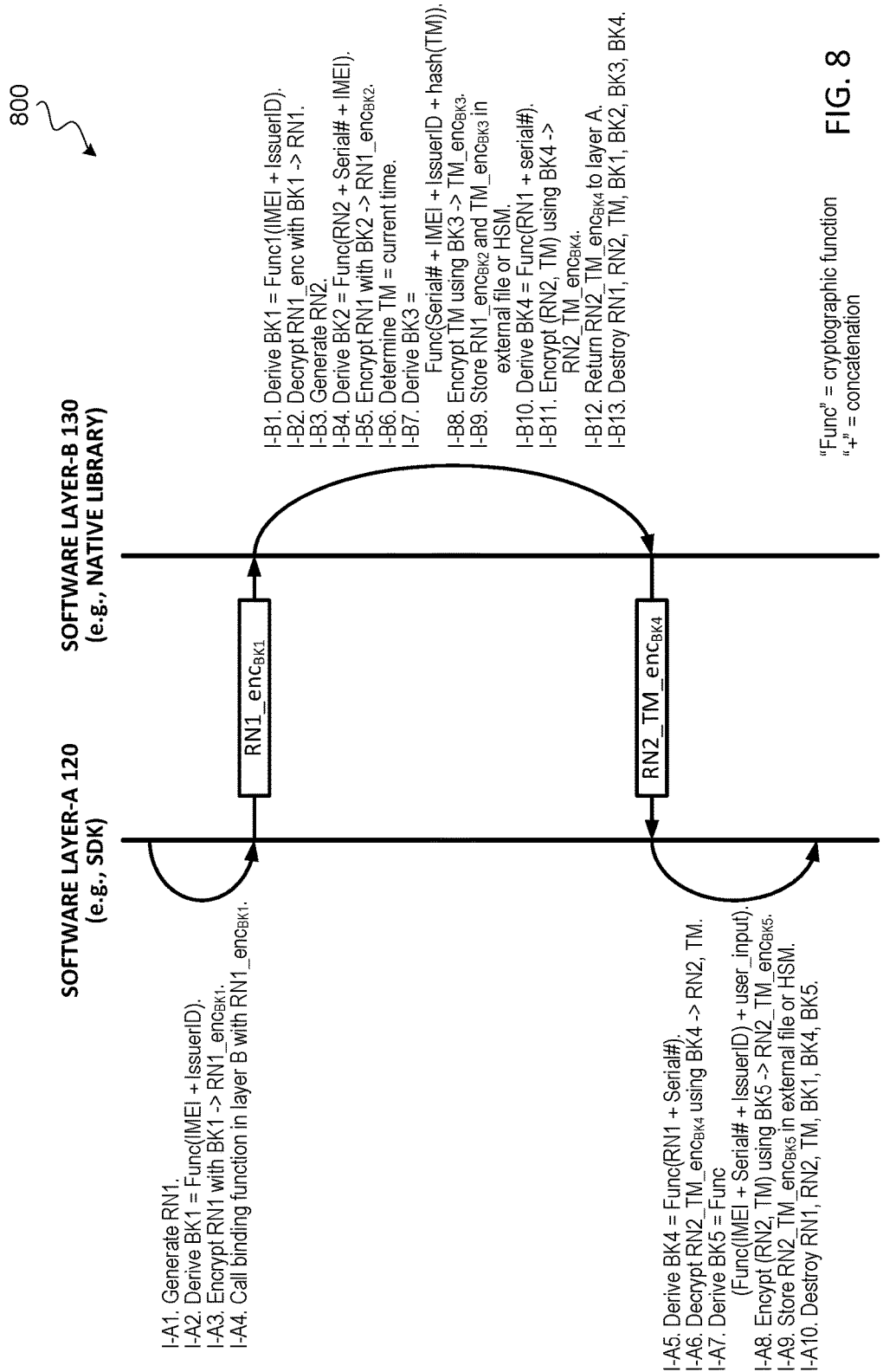
FIG. 8 illustrates a communication flow diagram of an example implementation of a binding algorithm, according to some embodiments.

FIG. 8 illustrates a communication flow diagram of an example implementation of a binding algorithm to bind a first software layer (e.g., software layer-A 120) to a second software layer (e.g., software layer-B 130) during the first time initialization of a software application, according to some embodiments. In some embodiments, software layer-A 120 can be a SDK (e.g., written in Java), and software layer-B can be a native library (e.g., written in C or C++), or vice versa. In some embodiments, the two software layers can be written in the same language. For ease of explanation, the steps performed in the binding algorithm during the first time initialization are denoted as "I-Xn"

where X indicates the software layer, and n is the step performed by that software layer. Various encryption keys (referred to as binding keys) are derived and used in the binding algorithm. The binding keys used in the binding algorithm are denoted as BKn.

At step I-A1, software layer-A 120 generates a random number RN1, which is used as a first nonce. RN1, for example, may have a bit length of 256-bits. At step IA-2, a first binding key BK1 is derived from information about the computing device and/or software application known to the software layers. For example, BK1 can be derived from applying a cryptographic function (Func) to a device identifier and an issuer identifier (IssuerID). In implementations in which the computing device is a mobile phone, the device identifier can be an International Mobile Station Equipment Identity (IMEI) associated with the mobile phone. IssuerID can be an identifier of the software application provider. In implementations in which the software application is a transaction application, IssuerID can be a non-mutable identifier uniquely identifying that issuer of the account whose credentials are used by the transaction application to conduct transactions. It should be noted that the IssuerID is not the same as the code version label (or version ID), as the Version ID is mutable and changes across software releases.

At step I-A3, software layer-A 120 encrypts RN1 with BK1 resulting in $RN1\_enc_{BK1}$. The encryption function used can be AES (Advanced Encryption Standard) or other suitable encryption algorithm. At step I-A4, software layer-A 120 calls the binding function in software layer-B 130 with $RN1\_enc_{BK1}$ as the parameter, and passes $RN1\_enc_{BK1}$ to software layer-B 130. RN1 serves as a secret generated by software layer-A 120 and shared with software layer-B 130 to bind the two software layers. It should be noted that $RN1\_enc_{BK1}$ is not sent in the clear, but is sent in an encrypted form to prevent a man-in-the middle from obtaining RN1.

At step I-B1, software layer-B 130 begins its execution of the binding function and derives BK1 using the same information as what was used by software layer-A 120 (e.g., IMEI and IssuerID). At step I-B2, $RN1\_enc_{BK1}$ received from software layer-A 120 is decrypted with BK1 to obtain RN1. At step I-B3, software layer-B 130 generates its own random number (RN2), which is used as a second nonce. RN2, for example, may have a bit length of 256-bits. At step I-B4, software layer-B 130 derives a second binding key BK2 by applying Func to RN2 and information about the computing device. For example, the information about the computing device can be a serial number (Serial#) and an IMEI associated with the computing device. At I-B5, RN1 is encrypted with BK2 using AES or other suitable encryption algorithms resulting in $RN1\_enc_{BK2}$.

At step I-B6, software layer-B 130 determines the initialization time information TM indicating the current time at which the binding algorithm is being executed. At step I-B7, software layer-B 130 derives a third binding key BK3 based on information about the computing device and/or software application and TM. For example, BK3 can be derived from applying Func to the serial number, IMEI, IssuerID, and a hash of TM. At step I-B8, TM is encrypted with BK3 using AES or other suitable encryption algorithms resulting in $TM\_enc_{BK3}$. At step I-B9, software layer-B 130 stores $RN1\_enc_{BK2}$ and $TM\_enc_{BK3}$ as binding information in an external file or HSM. It should be noted that both RN1 and TM are stored in an encrypted form to protect the actual values of the binding information.

At step I-B10, software layer-B 130 derives a fourth binding key BK4 by applying Func to RN1 and information about the computing device such as the serial number associated with the computing device. At step I-B11, RN2 and TM are encrypted with BK4 using AES or other suitable encryption algorithms resulting in $RN2\_TM\_enc_{BK4}$. At step I-B12, software layer-B 130 returns the value $RN2\_TM\_enc_{BK4}$ to software layer-A 120. RN2 serves as a secret generated by software layer-B 130 and shared with software layer-A 120 to bind the two software layers. It should be noted that $RN2\_TM\_enc_{BK4}$ is not sent in the clear, but is sent in an encrypted form to prevent a man-in-the middle from obtaining RN2 and TM. At step I-B13, at the completion of the binding algorithm for software layer-B 130, the unencrypted forms of RN1, RN2, and TM are destroyed or deleted from memory. The binding keys BK1, BK2, BK3, and BK4 used by software layer-B 130 are also destroyed or deleted from memory.

Upon receiving $RN2\_TM\_enc_{BK4}$ as the response data from calling the binding function in software layer-B 130, at step I-A5, software layer-A 120 derives BK4 using the same information as what software layer-B 130 used. For example, BK4 can be derived from applying Func to RN1 and the serial number. At step I-A6, software layer-A 120 decrypts $RN2\_TM\_enc_{BK4}$ with BK4 to obtain RN2 and TM in their unencrypted form. At step I-A7, software layer-A 120 derives a fifth binding key BK5 based on information about the computing device and/or software application, and optional user input (e.g., PIN or passcode) if available. For example, BK5 can be derived by applying Func to the IMEI, serial number, and IssuerID, and further applying Func to that result and user input (if available). At step I-A8, software layer-A 120 encrypts RN2 and TM with BK5 using AES or other suitable encryption algorithms resulting in $RN2\_TM\_enc_{BK5}$. At step I-A9, software layer-A 120 stores $RN2\_TM\_enc_{BK5}$ as binding information in an external file or HSM. It should be noted that RN2 and TM are stored in an encrypted form to protect the actual values of the binding information. At step I-A10, at the completion of the binding algorithm for software layer-A 120, the unencrypted forms of RN1, RN2, and TM are destroyed or deleted from memory. The binding keys BK1, BK4, and BK5 used by software layer-A 120 are also destroyed or deleted from memory.

Referring back to the generating of BK5, in some embodiments, if the user experience of the software application can tolerate requesting entry of user input (e.g., PIN or passcode) when the software application is used, user input that is not statically stored on the device can be incorporated into the algorithms to increase the security assurance level. Inclusion of use input that only an authorized user would have knowledge of can prevent unauthorized users from executing the software layers. In some embodiments, the inclusion of user input can be omitted from the algorithms to improve the user experience (to avoid requiring the user to manually enter a PIN or passcode). In such embodiments, BK5 can be generated without the user input, and the techniques described herein can still provide a sufficient security assurance level, because the algorithms incorporate the use of dynamic time information (as described further below), which is also not statically stored on the device.

IV. Example Implementation of Key Derivation Algorithm

Figure 9:
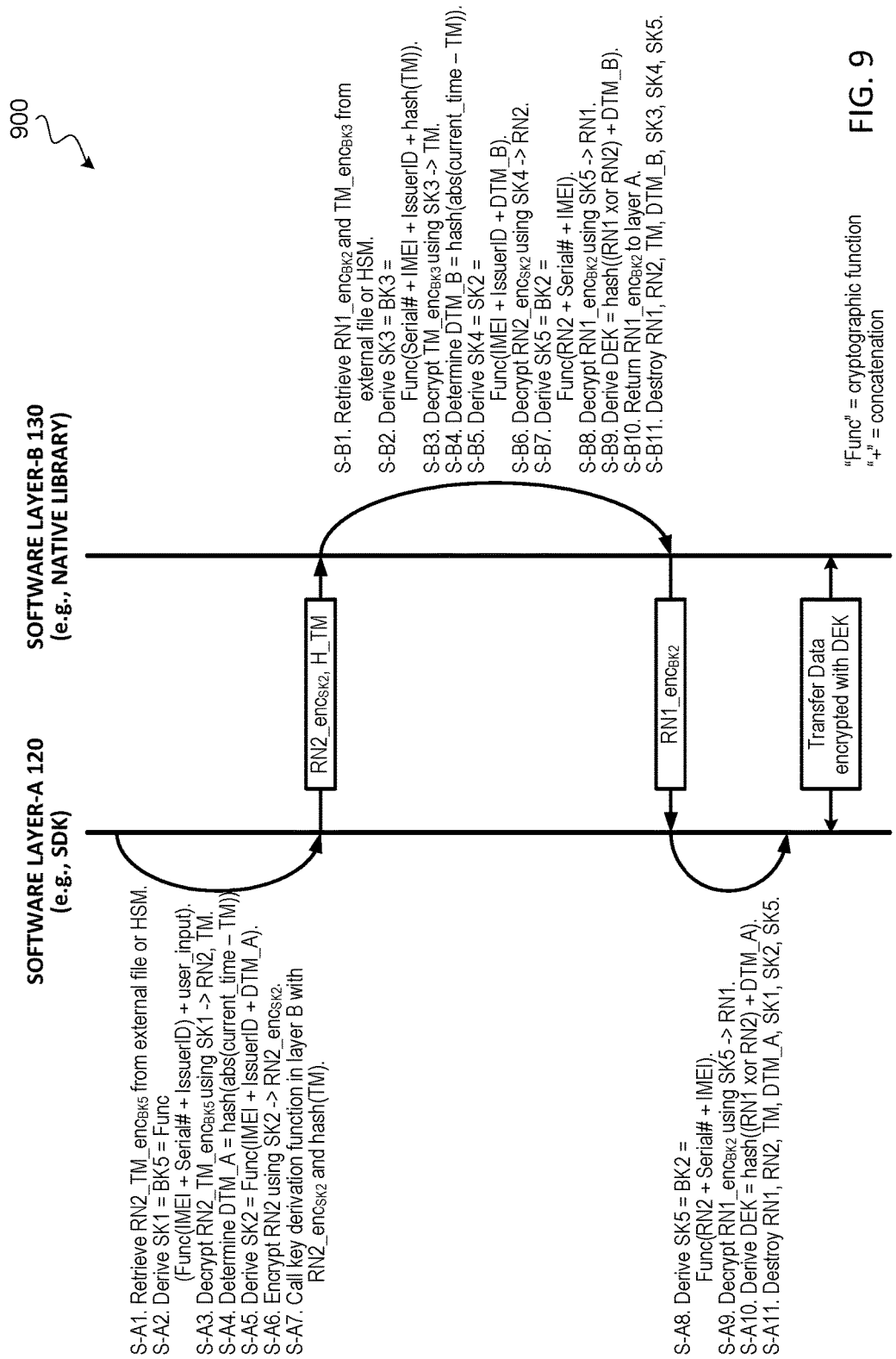
FIG. 9 illustrates a communication flow diagram of an example implementation of a key derivation algorithm, according to some embodiments.

FIG. 9 illustrates a sequence diagram of an example implementation of a key derivation algorithm to generate data encryption keys by a first software layer (e.g., software layer-A 120) and a second software layer (e.g., software layer-B 130) during runtime sessions of a software application, according to some embodiments. The process in FIG. 9 can be performed each time the software application is started or used subsequent to the first time initialization. For ease of explanation, the steps performed in the key derivation algorithm during runtime sessions are denoted as "S-Xn" where X indicates the software layer, and n is the step performed by that software layer. Various encryption keys (referred to as session keys) are derived and used in the key derivation algorithm. The session keys used in the key derivation algorithm are denoted as SKn.

At step S-A1, software layer-A 120 retrieves RN2_TM_enc$_{BK5}$ from an external file or HSM, which was stored by software layer-A 120 as binding information from the first time initialization. At step S-A2, software layer-A 120 derives a first session key SK1, which is the equivalent of BK5, For example, SK1 can be derived by applying Func to the IMEI, serial number, and IssuerID, and further applying Func to that result and user input (if available). At step S-A3, RN2_TM_enc$_{BK5}$ is decrypted with SK1 to obtain RN2 and TM. At step S-A4, software layer-A 120 determines dynamic time information DTM_A that provides an indication of the elapsed time from when the binding algorithm was execute (as indicated by TM) to the current time at which the key derivation algorithm is being executed. For example, DTM_A can be computed by hashing the absolute value of the difference between the current time and TM. This dynamic time information DTM_A can be combined with the binding information to generate a data encryption key in subsequent steps.

At step S-A5, software layer-A 120 derives a second session key SK2 based on information about the computing device and/or the software application and DTM_A. For example, SK2 can be derived by applying Func to the IMEI, IssuerID, and DTM_A. At step S-A6, RN2 is encrypted with SK2 using AES or other suitable encryption algorithms resulting in RN2_enc$_{SK2}$. At step S-A7, software layer-A 120 invokes the key derivation function in software layer-B 130 with the parameters RN2_enc$_{SK2}$ and a hash of TM.

At step S-B1, software layer-B 130 begins its execution of the key derivation function and retrieves RN1_enc$_{BK2}$ and TM_enc$_{BK3}$ from an external file or HSM, which were previously stored by software layer-B 130 as binding information from the binding algorithm during first time initialization. At step S-B2, software layer-B 130 derives a third session key SK3 which is the equivalent of BK3. For example, SK3 can be derived from applying Func to the serial number, IMEI, IssuerID, and a hash of TM. The hash of TM is one of the parameters received from software layer-A 120. At step S-B3, TM_enc$_{BK3}$ is decrypted with SK3 to obtain TM in an unencrypted form. At S-B4, software layer-B 130 determines dynamic time information DTM_B that provides an indication of the elapsed time from when the binding algorithm was execute (as indicated by TM) to the current time at which the key derivation algorithm is being executed. For example, DTM_B can be computed by hashing the absolute value of the difference between the current time and TM. This dynamic time information DTM_B can be combined with the binding information to generate a data encryption key in subsequent steps. In some embodiments, to ensure that DTM_A and DTM_B have the same value, the current time used in the determination of the dynamic time information is expressed in minutes (as opposed to smaller units of time such as seconds or milliseconds).

At step S-B5, software layer-B 130 derives a fourth session key SK4, which is the equivalent of SK2. For example, SK4 can be derived by applying Func to the IMEI, IssuerID, and DTM_B as determined by software layer-B 130. At step S-B6, RN2_enc$_{SK2}$, as received from software layer-A 120, is decrypted using SK4 to obtain RN2 in its unencrypted form. At step S-B7, software layer-B 130 derives a fifth session key SK5, which is the is the equivalent of BK2 using the unencrypted RN2. For example, SK5 can be derived by applying Func to RN2, the serial number, and IMEI associated with the computing device. At step S-B8, RN1_enc$_{BK2}$, as received from software layer-A 120, is decrypted with SK5 resulting in RN1 in its unencrypted form. At step S-B9, software layer-B 130 derives its data encryption key DEK by applying a hash to the result of XOR-ing RN1 and RN2, concatenated with DTM_B. The DEK is used by software layer-B 130 to encrypt and decrypt subsequent data transferred between the two software layers in the current runtime session. At step S-B10, RN1_enc$_{BK2}$ is returned to software layer-A 120 as the response data. At step S-B11, at the completion of the key derivation algorithm for software layer-B 130, the unencrypted forms of RN1, RN2, TM, and DTM_B are destroyed or deleted from memory. The session keys SK3, SK4, and SK5 used by software layer-B 130 are also destroyed or deleted from memory.

Upon receiving RN1_enc$_{BK2}$ as the response data from calling the key derivation function in software layer-B 130, at step S-A8, software layer-A 120 derives SK5, which is the equivalent of BK2. For example, SK5 can be derived from applying Func to RN2, the serial number, and IMEI. At step S-A9, RN1_enc$_{BK2}$ is decrypted with SK5 to obtain RN1 in its unencrypted form. At step S-A10, software layer-A 120 derives its data encryption key DEK by applying a hash to the result of XOR-ing RN1 and RN2, concatenated with DTM_A. The DEK is used by software layer-A 120 to encrypt and decrypt subsequent data transferred between the two software layers in the current runtime session. This DEK should be equivalent to the DEK derived by software layer-B 130 if the two software layers were properly bound at first time initialization. At step S-A11, at the completion of the key derivation algorithm for software layer-A 120, the unencrypted forms of RN1, RN2, TM, and DTM_A are destroyed or deleted from memory. The session keys SK1, SK2, and SK5 used by software layer-A 120 are also destroyed or deleted from memory. Once both software layers have derived their respective DEKs, subsequent data transferred between the software layers can be encrypted with the DEK.

V. Cryptographic Function

According to some embodiments, the cryptographic function Func described herein to derive the various binding and session keys can be a multipath cryptographic function in which the computational path is selected based on the input data to the cryptographic function. Each path can be computationally equivalent (use the same computational operations), but the operands fed into the computation can include different input data fragments. The runtime input data bits can be used to select which one of the computation paths to use.

For example, a cryptographic function may include a number of different computation paths. The computational path can be selected based on the values of particular bits of the input data to the cryptographic function. Each path is computationally equivalent and may perform, for example, a hash (e.g., Secure Hash Algorithm SHA-256) on the input data concatenated with the result of multiplying a selected byte from the input data with another selected byte form the input data. The particular bytes selected for the multiplication and the order of the concatenation can vary depending on which computational path is selected. Using such a multi-path approach can add more complexity to algorithm to prevent an adversary from reverse engineering the algorithms.

An example of a cryptographic function that has eight computation paths is listed below.

| Path | Computation |
|------|-------------|
| 000  | OUT_data = Hash(IN_data + (IN_data[3] * IN_data[5])) |
| 001  | OUT_data = Hash(IN_data + (IN_data[4] * IN_data[6])) |
| 010  | OUT_data = Hash(IN_data + (IN_data[5] * IN_data[7])) |
| 011  | OUT_data = Hash(IN_data + (IN_data[6] * IN_data[8])) |
| 100  | OUT_data = Hash((IN_data[3] * IN_data[5]) + IN_data) |
| 101  | OUT_data = Hash((IN_data[4] * IN_data[6]) + IN_data) |
| 110  | OUT_data = Hash((IN_data[5] * IN_data[7]) + IN_data) |
| 111  | OUT_data = Hash((IN_data[6] * IN_data[8]) + IN_data) |

In this example, the selection of which of the eight computation paths to take can be determined using three bits from the input data (IN_data). For example, the most significant three bits, least significant three bits, or three bits at particular bit locations can be used as the computation path selection bits. By way of example, if the three bits of the input data is '000', the first computation path is selected, and the output of the cryptographic function (OUT_data) is the hash of the concatenation ('+') of the input data (IN_data) with the result of multiplying the third byte of the input data (IN_data[3]) and the fifth byte of the input data (IN_data[5]). As this example illustrates, the computation operations for each computation path is the same, except different operands (e.g., variations or segments of the input data) or different order of concatenation are used depending on the computation path selected. It should be understood that a cryptographic function in other embodiments can have any number of different computation paths, depending on the desired complexity, and that the computations can include other types of operations not specifically described.

VI. Example System

Figure 10:
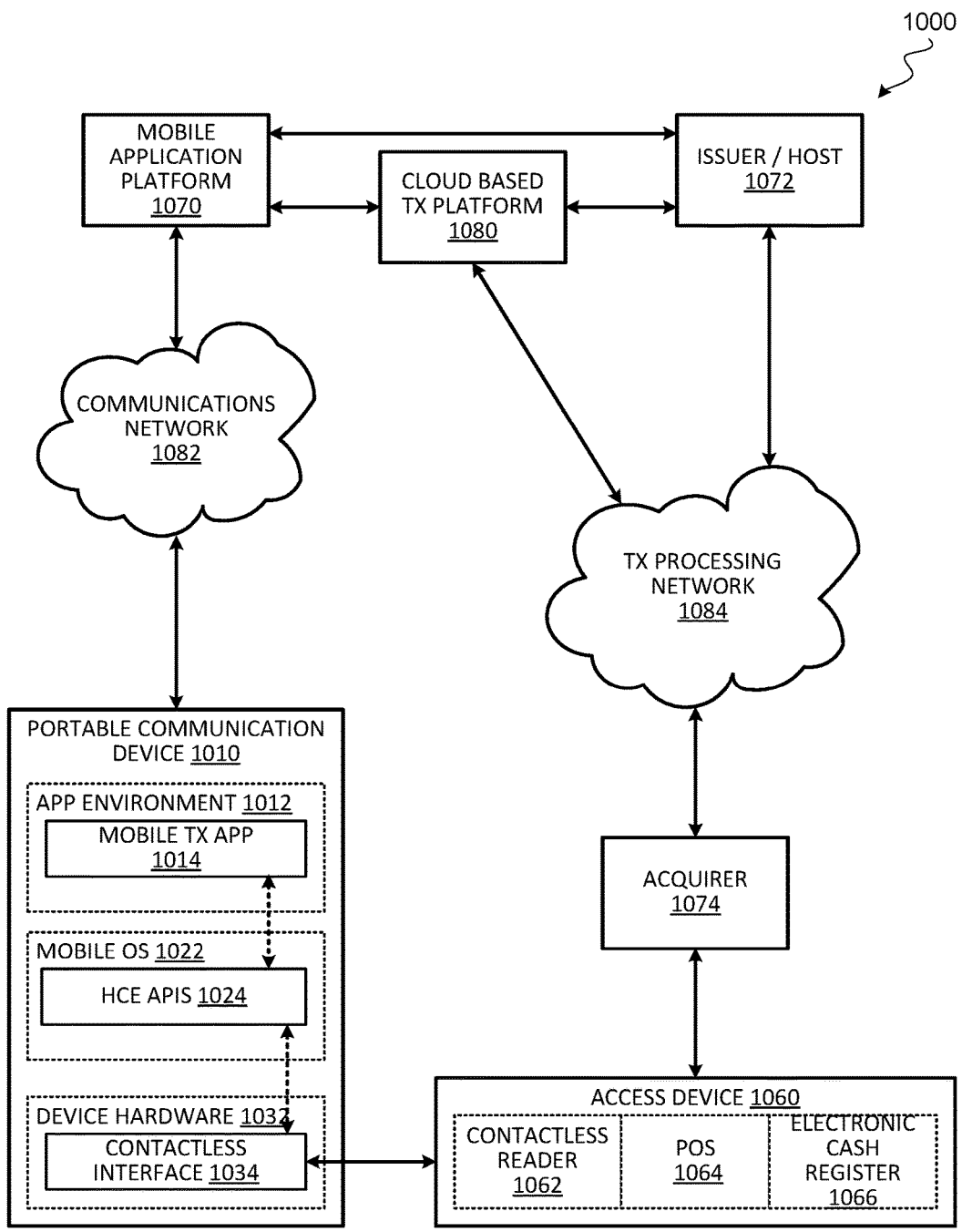
FIG. 10 illustrates a block diagram of system, according to some embodiments.

FIG. 10 illustrates a block diagram of an exemplary system 1000 in which the mutual authentication techniques described herein can be used, according to some embodiments. System 1000 can be, for example, a cloud-based transaction system for conducting cloud-based transactions. It should be understood that the mutual authentication techniques described herein can be applied to other types of systems which may or may not relate to transaction processing.

System 1000 includes a portable communication device 1010 (e.g., a mobile device), a cloud-based transaction platform (CBP) 1080, and a mobile application platform (MAP) 1070. CBP 1080 may be implemented using one or more computing devices, and can be associated with or operated by an issuer, transaction processor, and/or other suitable entities. CBP 1080 implements a set of functionalities including account management, and account parameters generation and replenishment to enable could-based transactions to be conducted via portable communication device 1010.

MAP 1070 is used to facilitate communications between CBP 1080 and mobile application 1014 (e.g., a transaction application) in portable communication device 1010. MAP 1070 may be implemented using one or more computing devices, and can be associated with or operated by the service provider of mobile application 1014 (e.g., mobile software application), such as an issuer, a mobile wallet provider, a merchant, and/or other suitable entities. In some embodiments, MAP 1070 can be associated with or operated by the same entity as CBP 1080, or they can be separate. MAP 1070 is used to intermediate requests between the mobile application 1014 and CBP 1080, and to ensure that requests and responses initiated by either party are fulfilled once connectivity to portable communication device 1010 is established, for example, via a communications network 1082 (e.g., internet, mobile or cellular network, etc.). It should be understood that in some embodiments, one or more functionalities of CBP 1080, MAP 1070, and/or issuer or host processing system 1072, may be integrated into the same computing system or different computing systems.

Portable communication device 1010 can be used to conduct cloud-based transactions (e.g., payment transactions) facilitated by CBP 1080 and/or MAP 1070. Portable communication device 1010 includes device hardware 1032, mobile operating system (OS) 1022, and applications environment 1012. Device hardware 1032 includes a contactless interface 1034 that can contactlessly communicate or otherwise present information to another device such as a contactless reader 1062 of an access device 1060. Examples of contactless interface 1034 can include a near-field communications (NFC) interface that can send and receive communications using radio frequency, or other wireless communication protocols such as Bluetooth, Bluetooth Low Energy (BLE), Wi-Fi, etc. Examples of contactless interface 1034 may also include an optical interface such as a display to present information such as quick response (QR) codes, bar codes, etc.

Applications environment 1012 of portable communication device 1010 may include a mobile application 1014 such as a transaction application provided by a service provider (e.g., an issuer). For example, if the service provider of mobile application 1014 is an issuer, mobile application 1014 may be a mobile banking application or a mobile payment application. If the service provider is a mobile wallet provider such as a mobile network operator or third-party wallet provider that supports multiple issuers, mobile application 1014 may be a mobile wallet application. For merchants, mobile application 1014 may be a merchant's own transaction application from which consumers can conduct e-commerce or point of sale transactions, or a mobile wallet application supporting multiple merchants.

In some embodiments, mobile application 1014 may include on-device cloud-based transaction logic integrated into mobile application 1014 to support cloud-based transactions. The on-device cloud-based transaction logic performs functions to facilitate cloud-based transactions such as to take account parameters provided for use in payment transactions and deliver them to mobile operating system 1022 for transmission over contactless interface 1034. For example, the on-device cloud-based transaction logic may use a cryptogram key (e.g., a limited-use key) provisioned from CBP 1080 to generate a transaction cryptogram that is transmitted over contactless interface to access device 1060 to conduct a payment transaction. The transaction cryptogram can be sent over to the transaction processing network 1084 to obtain authorization for the payment transaction. The on-device cloud-based transaction logic also manages the initial service profile parameters that are provided after an account has been provisioned to ensure that requests for account parameter replenishment and other account parameter management activities are initiated.

To provision portable communication device 1010 for cloud-based payment transactions, CBP 1080 can be used to configure account portfolios associated with issuers and to provide portable communication device 1010 with account parameters for use when conducting cloud-based transactions. The account portfolios established by CBP 1080 can include characteristics such as risk parameters (e.g., velocity controls) that manages the triggers of when account parameters on a provisioned device will need to be refreshed for accounts in each portfolio. To ensure consistent performance and usability, a set of minimum parameters configurable in a service profile can be implemented by CBP 1080. To ensure that cloud-based payment transactions are processed according to the rules specified in the service profile for an account portfolio, CBP 1080 performs various core functions during the lifetime of an account that has been enabled. These functions can include provisioning, active account management, verification for payment, transaction processing, lifecycle management and post-payment.

CBP 1080 may create a service profile for a portfolio before an account is provisioned as a cloud-based transaction account. Provisioning may include taking an enrolled account, create account information such as an alternate account identifier (e.g., alternate Primary Account Number (PAN)) or a token acting as an account identifier substitute that can be used instead of a real account identifier (e.g., a real PAN) to conduct transactions, and inheriting service profile has been established for the portfolio. Once an account is provisioned, the relevant service profile details are shared with both the transaction processing and the on-device cloud-based transaction logic to ensure that decision making can be done at transaction processing and during mobile application usage by the user.

Once an account is provisioned, active account management can be performed by CBP 1080. Active account management can be initiated either from transaction processing activity or from mobile application activity. After the account has been provisioned, the active account management capability generates the initial set of account parameters to be deployed to portable communication device 1010. The account parameters may include account information generated during provisioning (e.g., alternate account identifier or token), as well as dynamic information to ensure the set of account parameters have only a limited use or limited lifespan once delivered to the device. Dynamic information may include limited-use cryptogram keys or dynamic data depending on what type of transaction is being supported. For example, the dynamic information may include limited-use keys (LUK) to calculate cryptograms, as well as limited use dynamic data to support legacy dynamic card verification value or code based implementations.

During transaction processing, if the service profile parameters maintained by CBP 1080 for a particular account indicate that account parameters on portable communication device 1010 need to be replaced, the active account management capability of CBP 1080 may connect to portable communication device 1010 via MAP 1070 to replenish account parameters. Likewise, if the on-device service profile parameters stored on portable communication device 1010 indicate that account parameter replenishment is needed or is close to be being needed (i.e., by monitoring account parameter thresholds), then mobile application 1014 can make a request to CBP 1080 for account parameter replenishment.

Once portable communication device 1010 has been provisioned to conduct cloud-based transactions, transactions can be conducted via portable communication device 1010 by interacting with a contactless reader 1062 of an access device 1060 (e.g., at a merchant location). Components of access device 1060 may include point-of-sale (POS) terminal 1064 and/or electronic cash register 1066. Access device 1060 can be coupled to acquirer 1074 (e.g., via a merchant computer not shown). Acquirer 1074 may be connected to an issuer or host processing system 1072 via transaction processing network 1084. Transaction processing network 1084 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. Transaction processing network 1084 may use any suitable wired or wireless network, including the Internet.

Transaction processing network 1084 may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 1074, transaction processing network 1084, issuer or host processing system 1072) may include one or more computers to enable communications, or to perform one or more of the functions described herein.

To conduct a cloud-based transaction, a user of portable communication device 1010 may tap portable communication device 1010 against contactless reader 1062 (e.g., via NFC) of access device 1060, or display an image such as a bar code or QR code on a screen of portable communication device 1010 that can be scanned by contactless reader 1062 (e.g., an optical scanner or reader) of access device 1060. In some embodiments, portable communication device 1010 may provide access device 1060 with an account identifier (e.g., an alternate account identifier, a token, etc.) and additional information such as limited-use account parameters or information derived from the limited-use account parameters. For example, an account identifier or token, and/or additional information (e.g., transaction cryptogram) can be encoded in a bar code or QR code that is scanned by access device 1060; or the account identifier or token, and/or additional information can be transmitted to access device 1060 via NFC. In some embodiments, the limited-use account parameters may include a transaction cryptogram.

Access device 1060 or a merchant computer coupled to access device 1060 may generate an authorization request message including the account identifier and additional information (e.g., limited-use account parameters, or information derived from the limited-use account parameters), and forward the authorization request message to acquirer 1074. The authorization request message is then sent to transaction processing network 1084. Transaction processing network 1084 then forwards the authorization request message to the corresponding issuer or host processing system 1072 associated with an issuer of the account associated with portable communication device 1010.

After issuer or host processing system 1072 receives the authorization request message, the authorization request message may be parsed, and information in the authorization request message may be sent to CBP 1080 for verification. An authorization response message is then sent back to transaction processing network 1084 to indicate whether the current transaction is authorized (or not authorized). Transaction processing network 1084 then forwards the authorization response message back to acquirer 1074. In some embodiments, transaction processing network 1084 may decline the transaction even if issuer or host processing system 1072 has authorized the transaction, for example depending on a value of a fraud risk score or depending if limited-use account parameters are verified by CBP 1080. Acquirer 1074 then sends the authorization response message to the merchant computer and/or access device 1060. The authorization response results may be displayed by access device 1060, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by transaction processing network 1084. A clearing process is a process of exchanging financial details between an acquirer and an issuer to facilitate posting to a customer's payment account and reconciliation of the user's settlement position.

Figure 11:
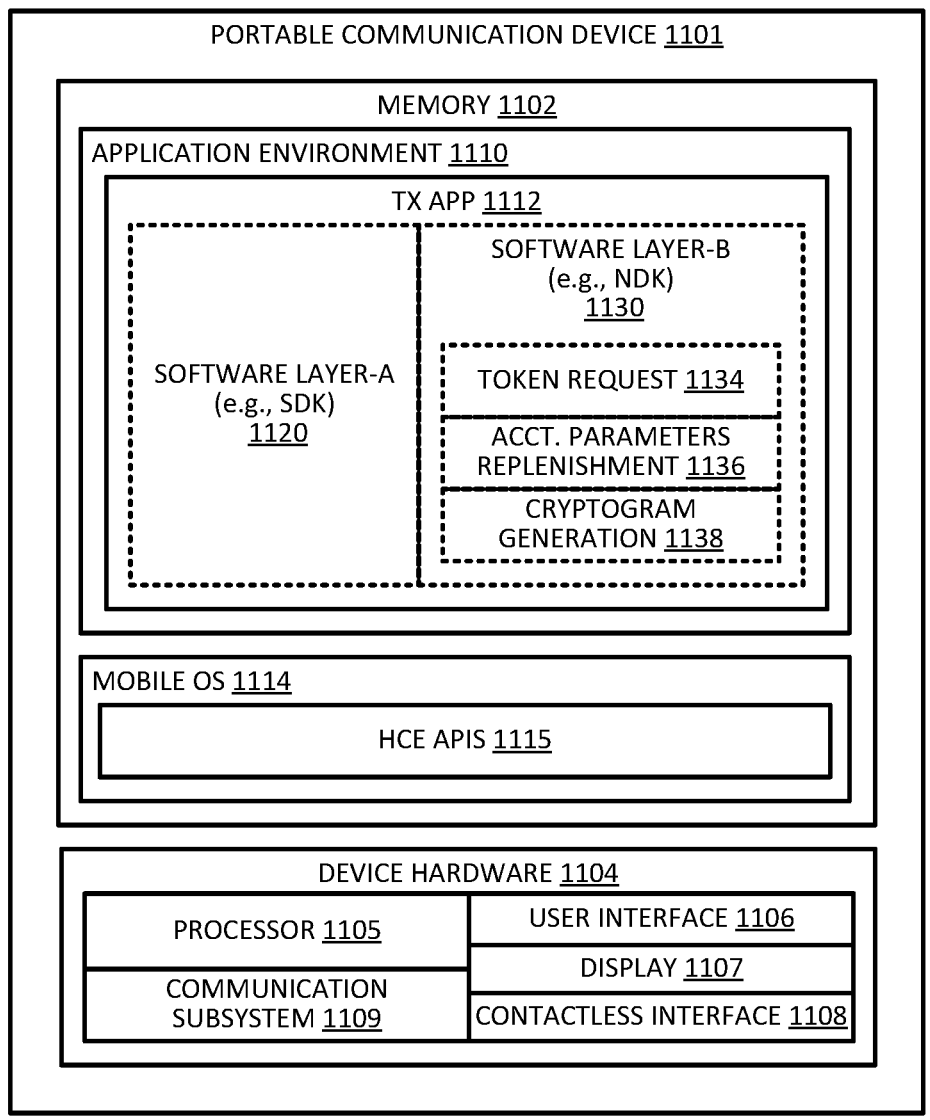
FIG. 11 illustrates a block diagram of portable computing device, according to some embodiments.

FIG. 11 illustrates a block diagram of a portable communication device 1101 (e.g., implementing portable communication device 1010) in which some embodiments of the processes described herein can be implemented. Portable communication device 1101 may include device hardware 1104 coupled to a memory 1102. Device hardware 1104 may include a processor 1105, a communications subsystem 1109, use interface 1106, a display screen 1107 (which may be part of user interface 1106), and a contactless interface 1108. Processor 1105 can be implemented as one or more integrated circuits (e.g., one or more single core or multicore microprocessors and/or microcontrollers), and is used to control the operation of portable communication device 1101. Processor 1105 can execute a variety of programs in response to program code or computer-readable code stored in memory 1102, and can maintain multiple concurrently executing programs or processes. Communications subsystem 1106 may include one or more RF transceivers and/or connectors that can be used by portable communication device 1101 to communicate with other devices and/or to connect with external networks. User interface 1106 can include any combination of input and output elements to allow a user to interact with and invoke the functionalities of portable communication device 1101. In some embodiments, display screen 1107 may be part of user interface 1106.

Contactless interface 1108 may include one or more RF transceivers to interact with a contactless reader of an access device to conduct a transaction (e.g., payment transaction, access transaction, information exchange, etc.). In some embodiments, contactless interface 1108 can be accessed by the mobile OS 1114 using card emulation APIs 1116 without requiring the use of a secure element. In some embodiments, display 1107 can also be part of contactless interface 1108, and is used, for example, to perform transactions using QR codes, bar codes, etc.

Memory 1102 can be implemented using any combination of any number of non-volatile memories (e.g., flash memory) and volatile memories (e.g., DRAM, SRAM), or any other non-transitory storage medium, or a combination thereof media. Memory 1102 may store a mobile OS 1114 and a mobile application environment 1110 where one or more mobile applications reside including transaction application 1112 (e.g., mobile wallet application, mobile banking application, mobile payments application, merchant application, etc.) to be executed by processor 1105. In some embodiments, mobile OS 1114 may implement a set of card emulation APIs 1116 that can be invoked by transaction application 1112 to access contactless interface 1108 to interact with an access device.

According to some embodiments, transaction application 1112 can include multiple software layers. For example, transaction application 1112 may include a first software layer 1120 (e.g., SDK) and a second software layer 1130 (e.g., NDK). The first software layer 1120 may include a set of public APIs that is used to implement non-security sensitive functions such user interface functions, networking or communications functions, as well as functions that may invoke security-sensitive functions implemented in the second software layer 1130. The first software layer 1120 can be written in a high level programming language such as Java. The second software layer 1130 may include a native library to implement security-sensitive functions such as token request function 1134, account parameters replenishment function 1136, cryptogram generation function 1138, etc. The second software layer 1130 may be written in a low level programming language such as C or C++.

Token request function 1134 can be invoked to request a token from a remote server (e.g., CBP, or issuer or host processing system). The token can be used as a substitute for a real account identifier to conduct transactions, for example, by sending the token to an access device. Using a token instead of a real account identifier can be more secure because the real account identifier is not transmitted when conducting a transaction. Token request function 1134 can be invoked, for example, at enrollment time to request an initial token, or when the lifespan of the current token has expired.

Account parameters replenishment function 1136 can be invoked to replenish or renew account parameters such as a limited-use key from a remote server (e.g., CBP, or issuer or host processing system). At the time of a transaction, the limited-use key is used to generate a transaction cryptogram that is provided to an access device to conduct the transaction. The limited-use key may be associated with a set or one or more limited-use thresholds (e.g., valid for a predetermined period of time, predetermined number of transactions, and/or predetermined cumulative transaction amount) to limit the usage of the LUK. When one or more of the limited-use thresholds of the LUK has expired or is about to expire, account parameters replenishment function 1136 can be invoked to request a new LUK.

Cryptogram generation function 1138 can be invoked at transaction time to generate a transaction cryptogram that is provided to an access device to conduct the transaction. The transaction cryptogram can be generated by receiving dynamic transaction data from the access device (e.g., transaction amount, transaction date, unpredictable number, etc.), and encrypting the dynamic transaction data with the LUK. In some embodiments, the transaction cryptogram can be generate by encrypting a static string instead with the LUK (e.g., if the access device does not support transmission of dynamic data to the portable communication device).

According to some embodiments, the security-sensitive functions implemented in the second software layer 1130 (e.g., token request function 1134, account parameters replenishment function 1136, cryptogram generation function 1138, etc.) can be protected from malicious code and man-in-the-middle attacks using the mutual authentication techniques described herein. When the first software layer 120 invokes these functions in the second software layer 130, the data and parameters passed between the software layers can be encrypted and decrypted using data encryption keys derived from binding information shared between the software layers during initialization of transaction application 1112 according to the mutual authentication techniques described herein.

Although the description above may have descried the mutual authentication techniques for use in an application having a first software layer and a second software layer, it should be understood that the techniques can be used to protect functions implemented in any software layer of an application. Furthermore, the application is not restricted to have only two software layers and can have any number of software layers (e.g., three or more software layers, portions, or libraries). Moreover, the mutual authentication techniques described herein can also be extended to software components that are not part of the same application. For example, the mutual authentication techniques described herein can be used to establish mutual authentication of two software applications that communicate with each other, or between a software application and an operating system, etc.

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the various embodiments may become apparent to those skilled in the art upon review of the disclosure. The scope of the invention may, therefore, be determined not with reference to the above description, but instead may be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It may be understood that some embodiments as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for establishing mutual authentication between a first software layer and a second software layer of an application using a data encryption key derived based on a first nonce generated by the first software layer and a second nonce generated by the second software layer during initialization of the application, the method comprising:
   retrieving, by the first software layer of the application executing on a computing device, binding information stored by the first software layer during the initialization of the application;
   decrypting, by the first software layer, the binding information to obtain the second nonce and initialization time information;
   receiving, by the first software layer, an encrypted first nonce from the second software layer of the application;
   decrypting, by the first software layer, the encrypted first nonce to obtain the first nonce;
   determining, by the first software layer, dynamic time information based on the initialization time information;
   deriving, by the first software layer, a data encryption key based on the first nonce that was generated by the first software layer, the second nonce that was generated by the second software layer, and the dynamic time information determined based on the initialization time information, wherein the data encryption key is derived by hashing a result of combining the first nonce, the second nonce, and the dynamic time information; and
   encrypting, by the first software layer, data being sent from the first software layer to the second software layer using the data encryption key.

2. The method of claim 1, wherein the data encryption key is derived by:
   combining the first nonce and the second nonce to generate a combined nonce;
   concatenating the combined nonce with the dynamic time information; and
   hashing a result of the concatenating.

3. The method of claim 1, further comprising:
   prior to retrieving the binding information:
      receiving, from the second software layer, an encrypted second nonce and encrypted initialization time information;
      decrypting, by the first software layer, the encrypted second nonce and the encrypted initialization time information to obtain the second nonce and the initialization time information;

re-encrypting, by the first software layer, the second nonce and the initialization time information to generate a re-encrypted second nonce and re-encrypted initialization time information; and storing the re-encrypted second nonce and the re-encrypted initialization time information as the binding information.

4. The method of claim 1, further comprising:
prior to retrieving the binding information:
generating, by the first software layer, the first nonce;
encrypting, by the first software layer, the first nonce; and
sending, by the first software layer, the encrypted first nonce to the second software layer.

5. The method of claim 3, wherein the first nonce is encrypted using a binding key derived from at least a computing device identifier associated with the computing device.

6. The method of claim 3, wherein the first nonce is encrypted using a binding key derived from at least an issuer identifier associated with an issuer of the application.

7. A method for establishing mutual authentication between a first software layer and a second software layer of an application using a data encryption key derived based on a first nonce generated by the first software layer and a second nonce generated by the second software layer during initialization of the application, the method comprising:

retrieving, by the second software layer executing on a computing device, binding information stored by the second software layer during the initialization of the application;

decrypting, by the second software layer, the binding information to obtain the first nonce and initialization time information;

receiving, by the second software layer, an encrypted second nonce from the first software layer;

decrypting, by the second software layer, the encrypted second nonce to obtain the second nonce;

determining, by the second software layer, dynamic time information based on the initialization time information;

deriving, by the second software layer, the data encryption key based on the first nonce that was generated by the first software layer, the second nonce that was generated by the second software layer, and the dynamic time information determined based on the initialization time information, wherein the data encryption key is derived by hashing a result of combining the first nonce, the second nonce, and the dynamic time information; and encrypting, by the second software layer, data being sent from the second software layer to the first software layer using the data encryption key.

8. The method of claim 7, wherein the data encryption key is derived by:
combining the first nonce and the second nonce to generate a combined nonce;
concatenating the combined nonce with the dynamic time information; and
hashing a result of the concatenating.

9. The method of claim 7, further comprising:
prior to retrieving the binding information:
receiving, from the first software layer, an encrypted first nonce;
decrypting, by the second software layer, the encrypted first nonce to obtain the first nonce;

re-encrypting, by the second software layer, the first nonce to generate a re-encrypted first nonce;
encrypting the initialization time information to generate encrypted initialization time information; and
storing the re-encrypted first nonce and the encrypted initialization time information as the binding information.

10. The method of claim 7, further comprising:
prior to retrieving the binding information:
generating, by the second software layer, the second nonce;
encrypting, by the second software layer, the second nonce;
encrypting, by the second software layer, the initialization time information; and
sending the encrypted second nonce and the encrypted initialization time information to the first software layer.

11. The method of claim 10, wherein the second nonce and the initialization time information are encrypted using a binding key derived from at least a computing device identifier associated with the computing device.

12. The method of claim 10, wherein the first nonce is encrypted using a binding key derived from at least the first nonce generated by the first software layer.

13. A computing device comprising:
a processor; and
a memory coupled to the processor and storing computer readable code for implementing an application having a first software layer and a second software layer;
wherein the computer readable code, when executed by the processor, causes the first software layer to:
receive an encrypted first nonce from the second software layer;
decrypt the encrypted first nonce to obtain the first nonce;
retrieve first binding information stored by the first software layer during initialization of the application;
decrypt the first binding information to obtain a second nonce; and
derive a data encryption key based on the first nonce, the second nonce, and dynamic time information representing an elapsed time since the initialization of the application, wherein the data encryption key is derived by hashing a result of combining the first nonce, the second nonce, and the dynamic time information;
wherein the code, when executed by the processor, causes the second software layer to:
retrieve second binding information stored by the second software layer during the initialization of the application;
decrypt the second binding information to obtain the first nonce;
receive an encrypted second nonce from the first software layer;
decrypt the encrypted second nonce to obtain the second nonce;
deriving the data encryption key based on the first nonce that was generated by the first software layer, the second nonce that was generated by the second software layer, and the dynamic time information, wherein the data encryption key is derived by hashing a result of combining the first nonce, the second nonce, and the dynamic time information; and wherein data being transferred between the first and second software layers are encrypted using the data encryption key.

14. The computing device of claim 13, wherein the initialization time information representing an initialization time of the application is generated by the second software layer during the initialization of the application, and provided to the first software layer by the second software layer.

15. The computing device of claim 14, wherein the initialization time information is encrypted prior to being provided to the first software layer.

16. The computing device of claim 15, wherein the initialization time information is encrypted using a binding key derived from at least the first nonce.

17. The computing device of claim 15, wherein the binding key is derived from at least a computing device identifier associated with the computing device.

* * * * *